United States Patent [19]

Bächtiger

[11] Patent Number: 4,674,104
[45] Date of Patent: Jun. 16, 1987

[54] CIRCUIT ARRANGEMENT FOR THE REGULATION OF A MULTICHANNEL PULSE COMPRESSION SYSTEM

[75] Inventor: Rolf Bächtiger, Oberwil, Switzerland

[73] Assignee: Siemens-Albis Aktiengesellschaft, Zurich, Switzerland

[21] Appl. No.: 830,765

[22] Filed: Feb. 19, 1986

[30] Foreign Application Priority Data

Feb. 28, 1985 [CH] Switzerland ............... 919/85

[51] Int. Cl.⁴ .................................. H04L 27/00
[52] U.S. Cl. ..................... 375/37; 332/9 R; 342/201
[58] Field of Search ............ 375/25, 37; 370/18, 370/109; 332/2, 9 R, 23 R; 343/7.1 R, 17.2 PC, 17.2 R

[56] References Cited

U.S. PATENT DOCUMENTS

| | | | |
|---|---|---|---|
| 3,303,497 | 2/1967 | Chubb | 343/17.2 PC |
| 3,618,095 | 11/1971 | Darlington | 343/17.2 PC |
| 3,862,371 | 1/1975 | Neustadt | 375/25 |
| 3,883,871 | 5/1975 | Moore | 343/17.2 R |
| 4,096,478 | 6/1978 | Chavez | 343/17.2 PC |
| 4,161,732 | 7/1979 | Longuemare, Jr. | 343/17.2 PC |
| 4,196,435 | 4/1980 | Phillips | 343/17.2 PC |
| 4,427,982 | 1/1984 | Caprio | 343/17.2 PC |
| 4,472,717 | 9/1984 | Eaves et al. | 343/17.2 PC |

Primary Examiner—Robert L. Griffin
Assistant Examiner—Stephen Chin
Attorney, Agent, or Firm—Werner W. Kleeman

[57] ABSTRACT

A type of transmitter, that transmits an unexpanded continuous unmodulated signal following a predetermined number of transmission pulses, is disclosed for the regulation of a multichannel pulse compression system. At least two compression channels are available which are inserted between a microwave receiver stage and a demodulator. A respective monitoring signal is extracted from the output of each compression channel and these monitoring signals are compared in a control circuit in order to obtain a phase difference signal and an amplitude difference signal. A respective control signal is derived from each difference signal in order to regulate a phase shifter and an attenuation circuit, which are provided in at least one of the compression channels, in such a manner that the phase difference signal and the amplitude difference signal are compensated towards zero.

4 Claims, 4 Drawing Figures

CIRCUIT ARRANGEMENT FOR THE REGULATION OF A MULTICHANNEL PULSE COMPRESSION SYSTEM

BACKGROUND OF THE INVENTION

The present invention broadly relates to signal compression systems and, more specifically, pertains to a new and improved circuit arrangement for the regulation of multichannel pulse compression systems.

Generally speaking, the arrangement of the present invention concerns a circuit arrangement for the regulation of a multichannel pulse compression system comprising a transmitter stage driven by a continuous unmodulated signal which is led in series through a pulse modulator, an expansion filter and a power amplifier to an antenna.

In its more particular aspects, the invention is concerned with certain influences, such as exposure to sunlight or solar radiation or component aging, that have differing or differential effects on the various channels in multichannel pulse compression systems such as those installed in radar and position finding technology.

In other words, the circuit arrangement of the present invention for regulating a multi-channel pulse compression system is of the type comprising a transmitter stage which comprises a pulse modulator, an expansion filter and a power amplifier connected to form a series circuit as well as an antenna. This transmitter stage serves to receive and modulate an unmodulated signal to form a pulse-modulated signal and to conduct the pulse-modulated signal to the antenna. The pulse modulator has an input and the expansion filter has an output. The circuit arrangement further includes a receiver comprising a microwave receiver stage, a demodulator and at least two signal compression channels connected between the microwave receiver stage and the demodulator. Each signal compression channel of the at least two signal compression channels has output terminals for tapping off a respective monitoring signal.

Therefore, the phase and the amplitude of the signal of each channel must be regulated in relation to the transmission response of a signal of a channel chosen as a reference channel. This is in order to achieve the required accuracy that depends in such systems to a large extent on the tracking response of the reception channels, especially in ascertaining an angle, e.g. the tracking angle. The known regulation techniques do not meet the requirements that systems with very short pulse durations demand.

SUMMARY OF THE INVENTION

Therefore, with the foregoing in mind, it is a primary object of the present invention to provide a new and improved circuit arrangement for the regulation of a multichannel pulse compression system which does not exhibit the aforementioned drawbacks and shortcomings of the prior art constructions.

Another and more specific object of the present invention aims at providing a new and improved circuit arrangement of the previously mentioned type for the regulation of a very broad bandwidth, high resolution, multichannel pulse compression system which operates with an extremely short pulse duration.

Yet a further significant object of the present invention aims at providing a new and improved circuit arrangement of the character described which is relatively simple in construction and design, extremely economical to manufacture, highly reliable in operation, not readily subject to breakdown or malfunction and requires a minimum of maintenance and servicing.

Now in order to implement these and still further objects of the invention, which will become more readily apparent as the description proceeds, the circuit arrangement of the present invention is manifested by the features that a switch is inserted between the input of the pulse modulator and the output of the expansion filter, and that this switch and the pulse modulator are switched on and off by a control signal in such a manner that, after a predetermined number of transmitter pulses, an unmodulated signal is periodically transmitted.

In other words, the circuit arrangement of the present invention is manifested by the features that it comprises a high frequency switch connected between the input of the pulse modulator and the output of the expansion filter for forming an unmodulated transmission signal from the unmodulated signal as well as a control stage for generating a control signal for selectively enabling and inhibiting the pulse modulator and the high frequency switch such that a predetermined number of modulated transmission pulses is transmitted and subsequently the unmodulated transmission signal is conducted to the antenna for transmission.

The receiver stage of the circuit arrangement comprises a control stage for controlling at least a desired one of at least one phase shifter or a regulatable amplifier or a combination of at least one phase shifter and a regulatable amplifier. The receiver stage further comprises signal compression channels and at least one compression stage provided in the signal compression channels for each of the control stages. Each control stage is connected subsequent to the compression stage provided for it. A comparator is provided in each control stage for comparing the monitoring signals with each other for obtaining a desired one of a phase difference signal or an amplitude difference signal or a combination of a phase difference signal and amplitude difference signal. A regulator stage is provided in each control stage for deriving therefrom at least one regulating signal for regulating the at least one control stage such that the desired one of the phase difference signal or the amplitude difference signal or the combination of the phase difference signal and the amplitude difference signal is compensated toward zero.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
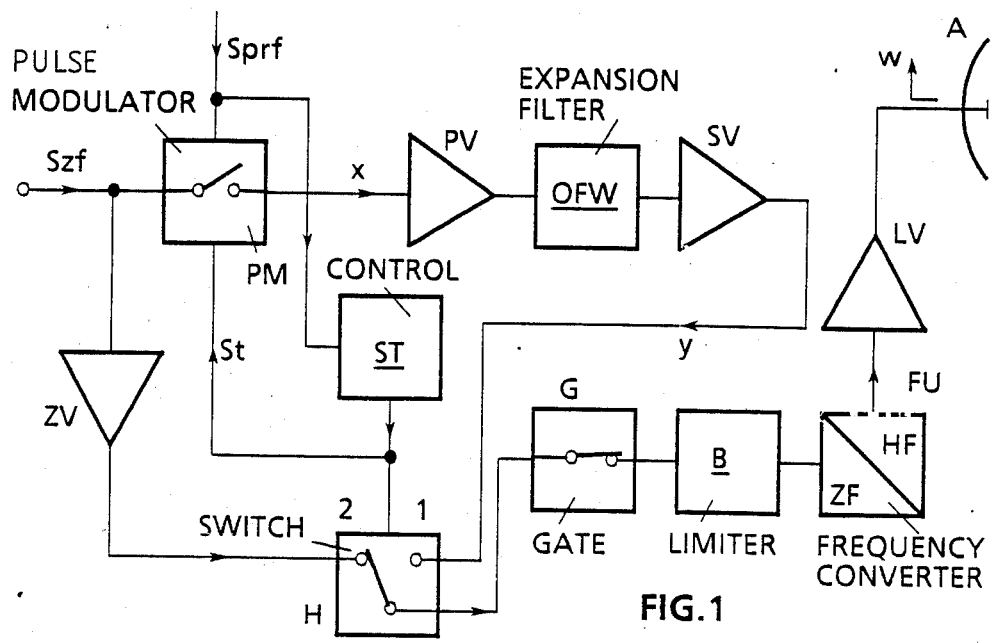
FIG. 1 shows a block circuit diagram of an expander in accordance with the invention.

Describing now the drawings, it is to be understood that to simplify the showing thereof only enough of the structure of the circuit arrangement for the regulation of a multichannel pulse compression system has been illustrated therein as is needed to enable one skilled in the art to readily understand the underlying principles and concepts of this invention. Turning now specifically to FIG. 1 of the drawings, the circuit arrangement illustrated therein by way of example and not limitation will be seen to comprise an expander stage which includes an expansion filter OFW. The expansion filter OFW is fed on its input side with an intermediate frequency input signal Szf that is initially conducted through a pulse modulator PM. The expansion filter OFW, which can be driven through a pulse amplifier PV and/or which can drive a signal amplifier SV, is connected on its output side through a series circuit comprising a high frequency gate G and a limiter or attenuator B to an input of a frequency converter FU.

An output of the frequency converter FU is connected through a power amplifier LV with a transmitting antenna A. According to the invention, a high frequency switch H is inserted between an input or input side of the pulse modulator PM and an input or input side of the high frequency gate G. If necessary, the high frequency switch H is connected in series with a supplementary amplifier ZV. The pulse modulator PM and the high frequency switch H can be switched on or off, i.e. enabled or inhibited, by a control output signal St of a control circuit ST which, e.g., comprises a frequency divider having a ratio of 1 to N for a continually pulsed frequency signal or pulse rate signal Sprf.

Figure 4:
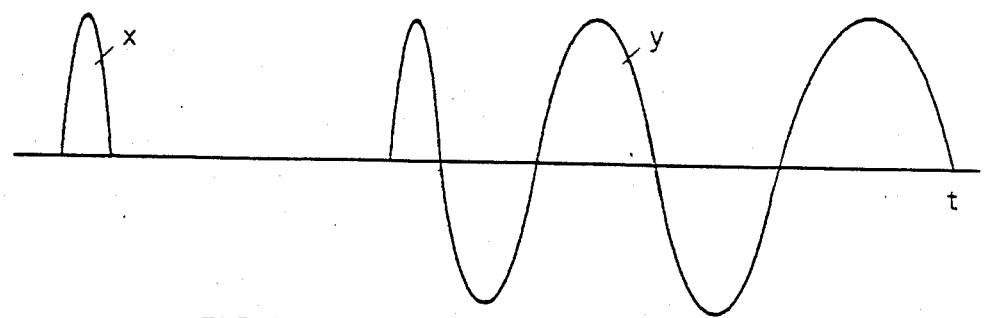
FIG. 4 shows an oscillogram of an expanded signal.

The principle of operation of an expander according to FIG. 1, but without the supplementary amplifier ZV and with a circuit connection comparable to the high frequency switch H only assuming position 1, is basically known. The pulse modulator PM, which is driven by the pulse rate signal Sprf, passes a single pulse or a burst or short pulse packet x (FIG. 4) of the continuous unmodulated signal Szf, i.e. a non-frequency modulated pulse or burst having the frequency of the carrier, only during the period when the pulse modulator PM is switched on or enabled by the control output signal St. The expansion filter OFW, which comprises a dispersive surface wave or surface acoustical wave delay line, expands the signal x in such a manner that it appears on the output side as a frequency modulated wave y whose signal duration is a multiple of the pulse width of the signal x. The signal y is then impressed or modulated onto a high frequency carrier in the microwave range, amplified and transmitted. A portion w of the transmitted signal is tapped off or extracted at the antenna A. The high frequency switch H is switched to position 2 only after a predetermined number N of bursts or pulse packets x have passed through. The number N can be relatively large, e.g. N=100, and can be time dependent. Periodically, or at a predetermined moment, the continuous unmodulated signal Szf is passed instead of the signal y, since the pulse modulator PM does not output a signal during this period. The duration of the transmitted or passed continuous unmodulated signal Szf is fixed by the high frequency gate G. The high frequency gate G also has the task of limiting or attenuating the duration of the signal y somewhat, to cut off amplitude build-up and decay flanks or oscillations.

Figure 2:
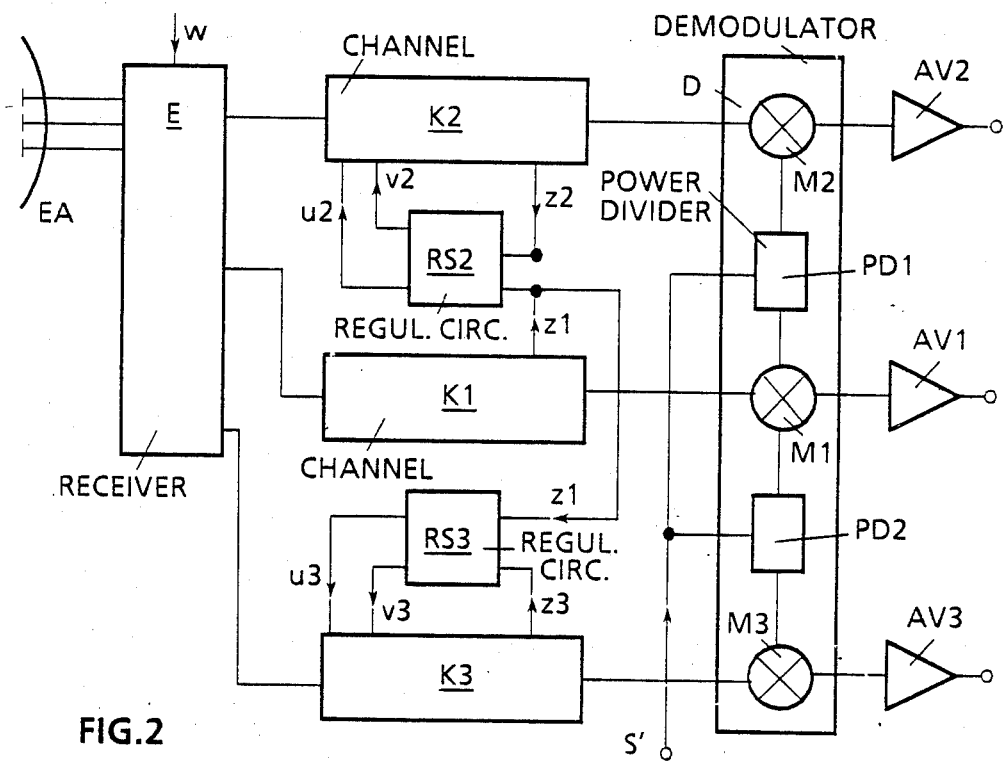
FIG. 2 shows a block circuit diagram of a three channel pulse compression system in accordance with the invention.

The three-channel pulse compression system according to FIG. 2 comprises a microwave receiver E connected with an antenna EA. The microwave receiver E is connected with a demodulator D on an output side through three channels K1, K2, K3. The signal w is impressed upon or drives the microwave receiver E. The system additionally comprises two regulating circuits RS2 and RS3 whose control output signals u2, v2 and u3, v3 serve the purpose of regulating the respective channels K2 and K3. Signals z1 and z2 tapped from the channels K1 and K2 are applied to an input side of the first regulating circuit RS2. The second regulation circuit RS3 has applied to it the signal z1 and a signal z3 tapped from the channel K3. A preferred embodiment of the demodulator D shown in FIG. 2 comprises multipliers M1, M2 and M3 for the respective channels K1, K2 and K3 as well as power dividers PD1 and PD2 connected to the multipliers M1, M2 and M3 and controlled by a local oscillator signal S'. Respective output amplifiers AV1, AV2 and AV3 amplify the outputs of the demodulator D corresponding to the channels K1, K2 and K3. The operation of the system according to FIG. 2 will now be explained in relation to the arrangement shown in FIG. 3.

Figure 3:
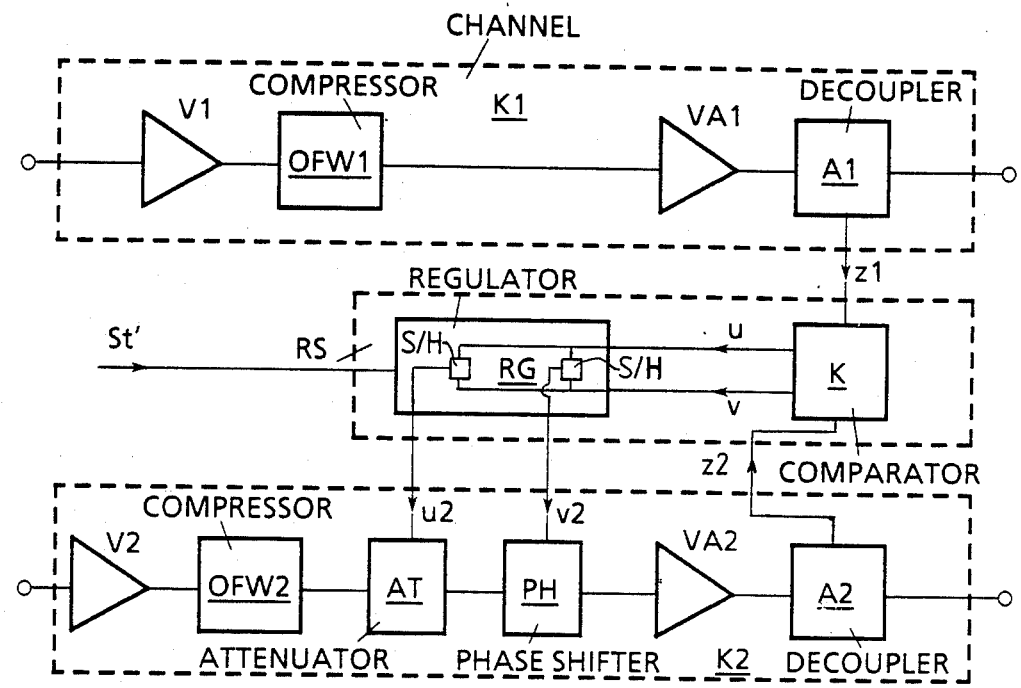
FIG. 3 shows a block circuit diagram of an arrangement for regulating a two channel pulse compression system in accordance with the invention.

Further details of the channels K1 and K2 and a regulating circuit or control stage RS are given in FIG. 3. The channel K1 comprises a series circuit including an amplifier V1, a first signal compressor or compression stage OFW1, a further amplifier VA1 and a first signal tap or decoupler A1 which is connected to the first input of the demodulator D. The demodulator D is controlled by the local oscillator signal S'. The signal S' can be an intermediate frequency reference signal, e.g., a signal derived from the intermediate frequency input signal Szf.

The channel K2 comprises a series circuit including an amplifier V2, a second signal compressor or compression stage OFW2, a regulatable attenuation circuit oraltenvator AT which also may be constituted by a regulatable amplifier, a regulatable phase shifter PH, a further amplifier VA2 and a second signal tap or decoupler A2 which is connected to the second input of the demodulator D (FIG. 2). A comparator K is additionally provided in the regulating circuit or control stage RS (FIG. 3) and, on the one hand, the second output signal z1 of the first signal tap or decoupler A1 is applied to an input side of the comparator K and, on the other hand, the second output signal z2 of the second signal tap or decoupler A2 is also applied to the input side of the comparator K. The comparator K delivers two voltage error signals u and v which are conducted to separate inputs of a regulator RG. The regulator RG comprises two separate sample and hold circuits S/H (FIG. 3) controlled or regulated by the signal St, and each having a separate regulating path. The regulator RG delivers two control signals u2 and v2 which serve the purpose of controlling the attenuation circuit AT and the phase shifter PH, respectively.

The operation of a circuit arrangement according to FIG. 3, with the exception of the elements K, RG, AT, and PH, is known per se. An expanded signal received by the antenna EA (FIG. 2) is compressed by the signal compressor or compression stage OFW1, which comprises a dispersive surface wave delay line, and is transferred through the signal tap or decoupler A1 to the demodulator D which could also be a quadrature or 90°-phase shift demodulator.

Should a signal, that passed through the switch H instead of through the expander stage or expansion filter OFW in the transmitter stage and which therefore does not represent a frequency modulated wave, happen to reach the signal compressor or compression stage OFW1 (FIG. 3), it will not be compressed because the signal compressor or compression stage OFW1 can only compress predetermined frequency modulated waves. A signal portion z1 is then decoupled or tapped from such a signal in the signal tap or decoupler A1. The same happens in the second channel K2 in which the signal compressor or compression stage OFW2 can also only compress frequency modulated waves and in which the elements AT and PH merely effect an amplitude regulation or a phase regulation. The error voltage signals are sampled and held in the regulator RG only when a signal St' exhibiting the same repetition frequency as the control output signal St is present. The signal St' can, however, be delayed and can feature a different pulse width compared to the signal St.

If transmitter and receiver are not sited together, i.e. if the signal St is not locally available, the comparator K could include equipment that would allow it to evaluate only non-frequency modulated waves.

The two control signals u2 and v2 delivered by the regulator RG are used to regulate the second signal compression channel K2 in such a manner that on average, the signals u and v tend toward or are compensated towards zero. No problems arise in the sizing or design of the transmitter regarding its dissipated power since the method of the invention does not alter the transmitted power. The invention is not limited to two channels and can be used in analogous manner for three or more channels by, e.g., using signals u3 and v3 (FIG. 2) to regulate a further attenuator circuit or a further phase shifter in the same way. Furthermore, the attenuator circuit AT can, for instance, be installed between the output of the compressor OFW1 and an input of the amplifier VA1 in channel 1. A regulatable amplifier can be installed instead of the attenuator circuit AT, and thus conceptually the component AT may be considered to be a regulatable amplifier.

The inventive arrangement can also be employed in a radar installation in which a single antenna with a transmitter-receiver unit is available, since the mode of operation is not influenced by this arrangement. These types of radar installations are, for instance, known from Swiss Pat. No. 592,887 or European Pat. No. 0 027 122.

The circuit arrangement of the invention enables a very exact regulation in radar installations which work with very short pulses. The advantage introduced here with radar installations that work with relatively long pulses is that the regulation can eliminate a possible fault after just one pulse. In such cases, the number N can be larger, e.g. N=1000 or more.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A circuit arrangement for regulating a multi-channel pulse system, comprising:
   a transmitter stage comprising:
   an antenna;
   a pulse modulator, an expansion filter and a power amplifier connected to form a series circuit for receiving and modulating an unmodulated signal to form a pulse-modulated signal and providing said pulse-modulated signal at said antenna;
   said pulse modulator having an input;
   said expansion filter having an output;
   a high frequency switch connected in circuit between said input and said output for forming an unmodulated transmission signal from said unmodulated signal; and
   a control stage for generating a control signal for selectively enabling and inhibiting said pulse modulator and said high frequency switch such that a predetermined number of modulated transmission pulses are transmitted and subsequently said unmodulated transmission signal is provided at said antenna for transmission.

2. The circuit arrangement as defined in claim 1, further including:
   a receiver stage comprising a microwave receiver;
   a demodulator;
   at least two signal compression channels connected in circuit between said microwave receiver and said demodulator;
   each signal compression channel of said at least two signal compression channels having a signal compression stage and an output terminal for tapping off a respective monitoring signal and connected in circuit with said signal compression stage;
   at least one of said at least two signal compression channels containing a desired one of at least one phase shifter or a regulatable amplifier or a combination of at least one phase shifter and a regulatable amplifier connected in circuit between said signal compression stage and said output terminal;
   a comparator connected with said output terminals of said at least two signal compression channels and comparing said monitoring signals with each other for obtaining a desired one of a phase error signal or an amplitude error signal or a combination of a phase error signal and an amplitude error signal; and
   a regulator stage connected in circuit with said comparator and deriving from said desired obtained error signal or combination of error signals at least one regulating signal for regulating said desired one of said at least one phase shifter or said regulatable amplifier or said combination of said at least one phase shifter and said regulatable amplifier.

3. The circuit arrangement as defined in claim 2, wherein:
   said high frequency switch has a predetermined repetition frequency; and
   at least one sample and hold circuit provided in said regulator stage for sampling and holding at least one of said obtained desired error signals or combination of error signals in dependence of the presence of a signal having a repetition frequency which is the same as said repetition frequency of said high frequency switch.

4. The circuit arrangement as defined in claim 2, wherein:
   said regulatable amplifier constitutes a regulatable attenuation element.

* * * * *

UNITED STATES PATENT AND TRADEMARK OFFICE
CERTIFICATE OF CORRECTION

PATENT NO. : 4,674,104

DATED : June 16, 1987

INVENTOR(S) : ROLF BÄCHTIGER

It is certified that error appears in the above-identified patent and that said Letters Patent is hereby corrected as shown below:

Column 4, line 40, please delete "oraltenvator" and insert --attenuator--

Signed and Sealed this

Seventeenth Day of November, 1987

Attest:

DONALD J. QUIGG

Attesting Officer

Commissioner of Patents and Trademarks